Patented Apr. 23, 1929.

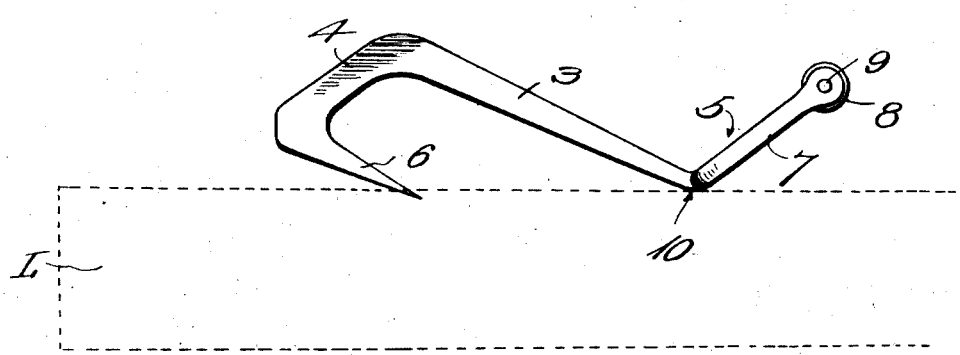
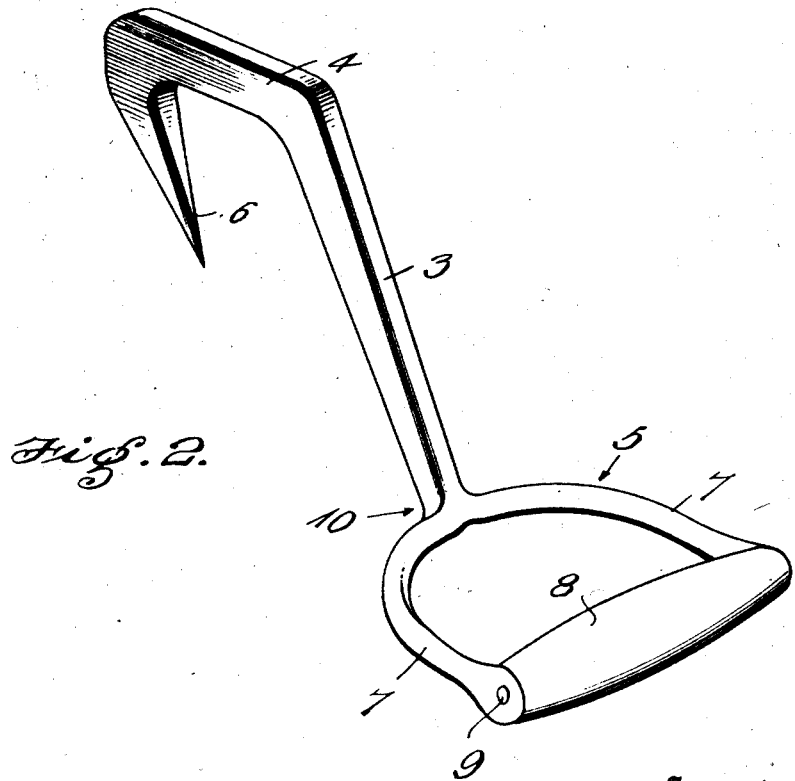

1,710,575

UNITED STATES PATENT OFFICE.

ASA T. GRANT, OF BANGOR, MAINE, ASSIGNOR OF ONE-HALF TO AMASA L. STEVENS, OF BANGOR, MAINE.

HAND HOOK.

Application filed August 29, 1927. Serial No. 216,255.

The invention aims to provide a new and improved hand hook so constructed that it may be quickly and easily engaged with a piece of wood or other object to be carried, simply by striking the hook against the object and at the same time jerking it to cause the hook bill to penetrate, the construction being such that there is no danger of the operator injuring his knuckles by contact with the wood or other object to be carried.

With the foregoing in view, the invention resides in the novel construction hereinafter described and claimed, the preferred form of such construction being shown by the accompanying drawing.

Fig. 1 is a side elevation of the hook and in dotted lines illustrating a log or the like engaged therewith.

Fig. 2 is a perspective view of the hook.

The shank of the hook embodies a straight major portion 3, a front end portion 4 which is also straight and is disposed at an obtuse angle to said major portion 3, and a rear portion 5 also at an obtuse angle to said major portion 3, the three portions 3—4—5 being all integral with each other. Integral with the extremity of the front end portion 4 of the shank and projecting rearwardly therefrom, is a straight hook bill 6 which is sharply pointed and is substantially parallel with the major portion 3 of the shank.

The rear shank portion 5 which projects in the opposite direction from the front portion 4, is preferably bifurcated, providing it with two arms 7 between which a handgrip 8 is secured by a rivet or the like 9. If desired however a construction could be employed in which a rear portion corresponding to 5, is not bifurcated and is provided at its rear extremity with a handgrip such as 8, it being common in the handhook art to provide either bifurcated or non-bifurcated ends, so that an illustration of the modification which I have mentioned, will be unnecessary.

The construction above described, insures that when the shank portion 10 at the juncture of the portions 3—5, comes in contact with a log or the like L to be carried, the hook bill 6 will be at an extremely acute angle to said log or the like, so that a forcible jerk on the hook handle will insure effective penetration of said bill to obtain an effective grip. Attention is also directed to the fact that while the hook is being engaged with the member to be carried and after such engagement, the handgrip 8 is so positioned that there is no danger of the user's knuckles coming in contact with said member and being injured.

Excellent results have been obtained from the exact details disclosed and they are therefore preferably followed. However, within the scope of the invention as claimed, slight variations may be made.

I claim:

1. A hand hook comprising a shank having a straight major portion, a front end portion at an obtuse angle to said major portion, and a rear end portion also at an obtuse angle to said major portion but projecting in the opposite direction and in a plane parallel to the plane of the front end portion, said front end portion of the shank being provided with a straight rearwardly projected hook bill substantially parallel with said major portion of said shank but diverging rearwardly therefrom, said rear portion of the shank being provided with a transverse handgrip.

2. A hand hook comprising a shank having a straight, relatively long, flat-sided, major portion gradually increased in width toward its front end but of substantially uniform thickness from end to end; a straight, relatively short, flat-sided front end portion of substantially the same width and thickness as the front end of said long major portion and of about half the length of the latter, said front end portion being disposed at an obtuse angle to said major portion; and a rear end portion also at an obtuse angle to said major portion but projecting in the opposite direction from that in which said front portion projects; a straight, rearwardly projecting hook bill on the front end of said front portion, said hook bill being substantially parallel with but at its inner edge rearwardly diverging from said long major portion and being substantially half the length of the latter, and a transverse hand grip secured to said rear end portion of the shank.

In testimony whereof I have hereunto affixed my signature.

ASA T. GRANT.